Sept. 26, 1967  G. F. LUTZ  3,343,190

TAP HOLDER

Filed Aug. 4, 1965

INVENTOR.
GILBERT F. LUTZ
BY
Hoffmann and Yount
ATTORNEYS

United States Patent Office 3,343,190
Patented Sept. 26, 1967

3,343,190
TAP HOLDER
Gilbert F. Lutz, Chesterland, Ohio, assignor to The Warner & Swasey Company, Cleveland, Ohio, a corporation of Ohio
Filed Aug. 4, 1965, Ser. No. 477,251
22 Claims. (Cl. 10—135)

ABSTRACT OF THE DISCLOSURE

The tap holder comprises a body member supported for axial movement on a machine tool slide or the like relative to a rotating workpiece. A sleeve adapted to support a tapping tool is supported by the body member for rotation and axial movement relative thereto. The sleeve has a cam formed thereon which cooperates with a fixed cam follower secured to the body member to control the axial movement of the sleeve. The cam is rotatable relative to the cam follower, and is biased to a predetermined position in which axial movement of the sleeve relative to the body is prevented in a direction opposite the direction of advancement of the tool toward the rotating workpiece while permitting relative axial movement in the direction of feed, so that the workpiece can pull the tool relative to the body member as the tapping operation commences. Upon completion of the tapping operation, the rotation of the workpiece is reversed and rotates the cam against the bias to another position relative to the cam follower which permits axial movement of the tool supporting sleeve by the workpiece in an axial direction opposite the direction of feed to permit the workpiece to initiate backing off the tap from the tapped hole. The sleeve is biased in one of two opposite directions of rotation by an adjustable spring means. The spring means biases the sleeve in abutment with a repositionable stop member provided in the body member to position the cam in the one predetermined position. The reverse rotation of the workpiece upon completion of the threading operation rotates the cam and sleeve against the bias of the spring to permit the described relative axial movement thereof. By appropriate adjustment of the spring and repositioning of the stop member the toolholder can be readily adapted for cutting right or left-hand threads.

This invention relates to a toolholder for supporting a tool on a machine tool and in particular to a toolholder for supporting a tapping tool which is adapted to engage a rotating workpiece to form threads therein on a machine tool slide and permitting relative axial movement between the tool and the slide.

A tap holder and a workpiece to be threaded by a tap carried by the tap holder are generally supported for relative rotational movement and for relative axial movement to effect the tapping operation and removal of the tap from the tapped opening in the workpiece. A separate drive is provided for effecting the relative rotational and relative axial movements respectively, each positively driven from a common source. Problems are created in the tapping operation due to the fact that the relative rotational movement and the relative axial movement may not be correctly synchronized. For example, the relative rotational movement may cause the tap to be drawn into the workpiece faster than the relative axial movement would permit. Moreover, when the tap is to be removed from the tapped opening in the workpiece, the direction of relative rotational and relative axial movements are reversed. Often the direction of one of these relative movements is reversed before the other due to backlash in the drives effecting the relative movements which would cause thread damage if not compensated for. For example, if the direction of relative rotation is reversed before the direction of relative axial movement is reversed, the tap will be forced outwardly of the tapped opening. This causes the tap to tend to force the tap holder and workpiece relatively in an axial direction and often results in thread damage. Tap holders constructed to compensate for these problems have been intricate and complex and difficult to adjust for right and left threading operations.

Accordingly, an important object of the present invention is the provision of a new and improved toolholder for supporting a tapping tool on a machine tool slide and which allows relative axial movement between the tap and the machine tool slide during tapping and during removal of the tap from the tapped opening and which is readily adjustable for performing right or left-hand tapping operations without substantial disassembly.

Another object of the present invention is the provision of a new and improved toolholder for a tapping tool which is simple in construction and durable and which is constructed so as to permit movement of the tap into the workpiece faster than the relative axial movement between the tap and workpiece would allow, as well as to permit without thread damage movement of the tap outwardly of the workpiece before the drive providing for relative axial movement between the tap and workpiece is operated, and wherein the tap holder is readily adjusted to permit the above-noted relative movements during the formation of either right or left-hand threads on the workpiece.

A further object of the present invention is the provision of a tap holder for holding a tap which is moved axially to engage a rotating workpiece and comprising a tap holder sleeve which receives the tap and is rotatably and slidably received within a support therefor and is connected to the support in such a manner that the sleeve is held against rotation in the direction corresponding to the direction of rotation of the workpiece during tapping and is held against axial movement in the direction opposite the direction of feed of the tool during tapping and which can rotate as well as move axially as said tap is removed from the workpiece to prevent thread damage caused by a lag in the drive means for moving the toolholder axially.

Another object of the present invention is the provision of a toolholder of the type referred to in the next preceding paragraph, in which a spring means is effective to bias the tap holder sleeve in opposite directions of rotation relative to the support therefor corresponding to the direction of rotation of the workpiece during the tapping operation and which spring means is capable of being readily adjusted to bias the sleeve in either direction so that the toolholder can be quickly adjusted for left or right-hand threading of the workpiece.

A further object of the present invention is the provision of a new and improved toolholder of the type referred to which includes a lost motion connection between the tap holder and support therefor including a member fixedly connected to the support and engageable with a part of the tap holder during axial movement toward the workpiece and permitting rotation of the tap holder relative to the support in the direction opposite to the direction in which the workpiece is rotating during the tap forming operation to a position wherein the member and part are disengaged and the part may move axially relative to the member to provide for relative axial movement between the tap holder and the support.

A further object of the present invention is the provision of a new and improved toolholder of the type referred to wherein the tap holder includes a cam surface and the support therefor includes a cam follower and a spring is effective during tapping to bias the holder to present a portion of the cam surface to the cam follower which engages the portion of the cam surface and prevents relative axial movement between the tap holder and support in a direction opposite the direction of axial movement of the tap and reverse rotation of the workpiece upon completion of the tapping operation rotates the toolholder against the bias of the spring presenting a different portion of the cam surface to the follower whereby the tap holder can move relative to the support in the axial direction of tool withdrawal thereby minimizing the possibility of damage to the threads formed on the workpiece.

A further object of the present invention is the provision of a new and improved toolholder of the type referred to in which a spring is effective to bias the tap holder sleeve selectively in opposite directions of rotation relative to the support therefor into engagement against an abutment carried by the support preventing angular movement of the tap holder sleeve relative to the support in one direction but which is effective upon reverse rotation of the tool caused by reversing the direction of rotation of the workpiece to permit rotation of the sleeve to a position wherein relative axial movement between the sleeve and the support may occur to compensate for differential withdrawal speeds produced by the workpiece acting on the tap and the drive means for withdrawing the toolholder therefrom.

Another object of the present invention is the provision of a new and improved toolholder of the type referred to wherein the abutment is readily positionable in one of two positions and the spring means is infinitely adjustable to bias the tap holder in opposite directions into engagement with the abutment in its selected position to provide for cutting right or left threads on the workpiece.

These and other objects will become apparent to those skilled in the art to which the invention relates from the following description of the preferred embodiment thereof described with reference to the accompanying drawings forming a part of this specification and in which.

Figure 1:
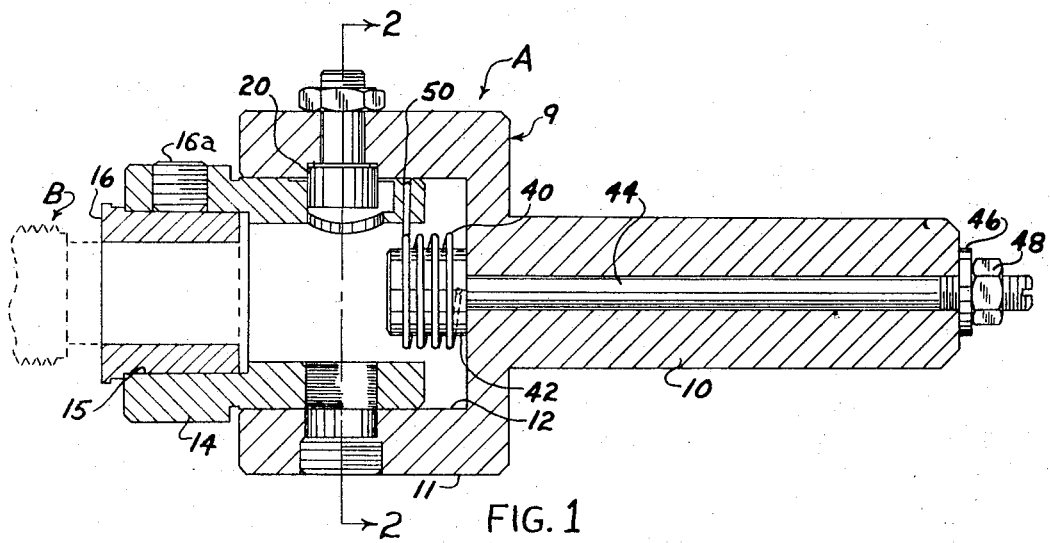
FIG. 1 is an axial sectional view of a toolholder embodying the present invention.

Referring to the drawings, the present invention is illustrated as preferably embodied in a toolholder A. The toolholder A is adapted to support a tapping tool B which is adapted to cut threads in a workpiece upon relative rotation therebetween. The toolholder A is connected to a machine tool slide and moved axially toward and away from the workpiece upon movement of the machine tool slide. The workpiece is rotated by the machine tool and is engaged by the tap to perform the tapping operation due to the relative axial and rotational movement therebetween.

The tap holder A includes a support or body member 9 having a shank portion 10 adapted to be fixedly connected in a conventional manner to the machine tool slide for movement therewith. An enlarged body portion 11 in the form of a sleeve extends from one end of the shank portion 10 toward the workpiece. The body portion 11 has an opening 12 therein, slidably and rotatably receiving a tap holder sleeve 14. The tapping tool B is detachably secured in a passage 15 in the sleeve 14, and specifically is received in a bushing 16 tightly surrounding the shank of the tap B which in turn is located in the passage 15 and secured therein by a set screw 16a.

As noted above the tap holder A is fixedly secured to a machine tool slide and is advanced axially thereby toward and away from a rotating workpiece secured in a driven chuck of the machine tool. The tap is advanced into the workpiece at a predetermined rate and is held against rotation with the workpiece thereby cutting threads into the workpiece. After the threading operation has been completed, the tool B is unthreaded from the workpiece. Normally a tool is backed off by reversing the direction of rotation of the workpiece which tends to unthread the tool therefrom and the machine tool slide moves the toolholder and attached tool axially. A problem arises when the reverse axial movement of the machine tool slide lags the reverse rotation of the workpiece due to the backlash in the slide drive. If this occurs, the reverse rotation of the workpiece tends to force the tap out of the threaded opening against the pressure exerted by the machine tool slide and may cause axial shifting of the slide resulting in possibly stripping the last few threads, i.e., the first formed threads, in the opening. A problem also exists when the tap initially engages the rotating workpiece because the rotating workpiece tends to draw the tap into the opening and this may occur at a faster rate than the axial movement of the slide. The toolholder A accordingly provides for relative axial movement between the tap and the slide in the direction of tool feed during tapping and opposite to that feed direction on removal of the tap from the tapped opening.

The tap B is permitted to move axially relative to the machine tool slide due to the construction and association of the tap holder sleeve 14 and support 9 which supports the tap holder sleeve and is connected to the machine tool slide. The tap holder sleeve 14 and support 9 are connected so that the axial motion of the support may be transmitted to the sleeve 14. However, the connection is such as to permit relative axial movement between the sleeve 14 and support 9, and thus may be termed a lost motion connection.

Figure 3:
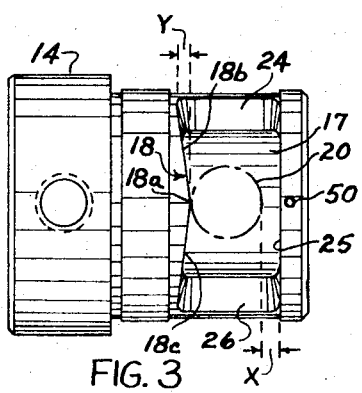
FIG. 3 is a plan view of a part of the tap holder of FIG. 1.

The sleeve 14 specifically includes a non-circular circumferentially extending opening 17 in the periphery of the sleeve 14 with a camming surface 18 formed along the side of the opening adjacent the tap B. The cam surface 18 cooperates with a cam follower 20 carried by the body 11. The cam surface configuration best shown in FIG. 3 includes a high central portion 18a which projects axially outward toward the shank 10 when the tap holder sleeve 14 is assembled in the body 11 and symmetrical portions 18b, 18c sloping downwardly from portion 18a and toward the tap B joining respectively opposite end sides 24, 26 and defining the opening 17 along with the cam surface 18 and opposite side 25. When the sleeve 14 is oriented angularly relative to the cam follower 20 so that cam portion 18a is in engagement therewith, relative axial movement between the sleeve 14 and support 9 is prohibited in the axial direction opposite to the direction in which the machine tool slide is driving the tool toward the workpiece while permitting relative axial movement therebetween in the direction of feed in an amount equal to the distance X between facing sides of the cam follower 20 and the side 25. Rotation of the sleeve 14 clockwise or counterclockwise moves one of the sloping cam portions 18b, 18c in alignment with the facing surface of cam follower 20 creating a gap Y therebetween permitting the sleeve to move axially under the influence of the reversely rotating workpiece in the direction opposite the direction of feed. This described lost motion connection will provide the required relative axial movements between these parts to compensate for any differential tap movement due to any differential in the tap feed rate between the engaged rotating workpiece and the machine tool slide both during the engagement of the tap with the workpiece and in the withdrawal of the tool therefrom.

The tapping tool B must be held against rotation during the tapping operation and to this end the enlarged body portion 11 of support 9 has two threaded holes 28 and 30 angularly spaced about the circumference and which are adapted to alternately receive a stop screw 32 or plug screw 34 depending upon whether right or left-hand threads are to be formed by the tapping tool. In the illustrated embodiment, the stop screw 32 is shown threaded in opening 28 of the body 11 to engage with side 24 defining part of the opening 17 in the sleeve 14. When assembled in this manner, the sleeve can be rotated clockwise until side 24 engages stop screw 32 at which time further clockwise rotation thereof is prevented. When the stop screw 32 is in engagement with side wall 24 of the opening 17, cam follower 20 is opposite the high point 18a of the cam surface 18. Of course this set up permits relative rotation of sleeve 14 in the counterclockwise direction until side 26 engages the cam follower 20. To change the toolholder for cutting threads in the opposite direction, the stop screw 32 and plug screw 34 positions are reversed from their respective positions illustrated in the drawing so that the stop screw 32 is in hole 30 and the plug screw 34 is in opening 28 whereby sleeve 14 would be restrained against rotation relative to support 9 in the counterclockwise direction as viewed in FIG. 2 while being permitted to rotate in the clockwise direction. Plug screw 34 functions to prevent foreign matter from entering the opening which is not occupied by the stop screw.

The sleeve 14 is biased into engagement with the stop screw 32 by means of a torsion spring 40 adjustably supported by a rod 44 which extends through an opening in the shank 10 and is adjustably secured thereto by means of a washer 46 and nut 48. The rod 44 has an enlarged head portion 42 disposed in opening 12 about which the spring 40 is wound with one end of the torsoin spring anchored thereto and the other end extending outwardly from the head portion into a hold 50 in the sleeve 14. Spring 40 is infinitely adjustable and has a neutral position in which no bias is exerted on the sleeve. Rotation of rod 44 in opposite directions sets the spring for biasing sleeve 14 selectively in opposite directions into engagement with stop screw 32. This adjustment is readily accomplished by rotating rod 44 at the end thereof projecting beyond shank 10' Rotation of rod 44 in the clockwise direction as viewed in FIG. 2 will cause torsion spring 40 to bias sleeve 14 in the clockwise direction moving side 24 into engagement with the stop screw 32 assuming the set up illustrated in the drawings. When the desired extent of rotation of rod 44 has been accomplished, nut 48 is adjusted to secure the rod against rotation relative to shank 10 in its adjusted position. The spring is rotated to an extent sufficient to exert a predetermined bias on the sleeve to produce engagement with the stop screw 32 when free of the workpiece.

The infinite adjustment of the spring 40 permits the holder to be used for cutting extremely fine threads and for cutting threads in soft metals. The spring can be set for the particular material and threads being cut so as to provide minimum opposition to the rotating tap upon reversal of the direction of rotation of the workpiece, whereas in a fixed spring arrangement no such adjustment is possible.

When the tapping operation is completed, the workpiece is rotated in the reverse direction to remove the tap B therefrom and at the same time the reverse axial slide drive is energized. Due to the backlash in the slide reverse drive, the tool B may begin unthreading from the newly formed threads by reverse rotation of the workpiece prior to axial movement of the slide. When this occurs, the lost motion connection between the tap holder sleeve 14 and tap holder sleeve support 9 permits sleeve 14 to make a partial revolution in the counterclockwise direction against the bias of spring 40 moving the cam portion 18a of sleeve 14 out of alignment with the cam follower 20 and providing for corresponding relative axial movement between the sleeve and support. A clearance is maintained between cam follower 20 and cam 18 during tool withdrawal from the workpiece by the slide drive so that the rotating workpiece and in particular the newly formed threads thereon move the tapping tool B axially out of the tapped hole in the workpiece. This lost motion connection therefore eliminates the necessity of providing for instantaneous reverse movement of the slide to correspond to the axial movement of the tool as it is moved out of the threaded opening by the rotating workpiece. The reverse slide drive in this instance need only maintain the clearance Y to afford sleeve 14 the necessary axial freedom of movement during the back out or withdrawal from the tapped hole. When the tap is fully withdrawn from the workpiece, the spring 40 moves the sleeve 14 axially to cause the cam 20 to contact cam surface 18. This insures that the next tapping operation has a firm start.

The circumferential length of opening 17 in sleeve D and the spacing between holes 28, 30 in support 9 are such that when side 24 or 26 is biased into engagement with the stop screw 32, the cam surface portion 18a is in engagement with the cam follower 20 of the support 9 which is the relative position of the sleeve and support during tapping.

Figure 2:
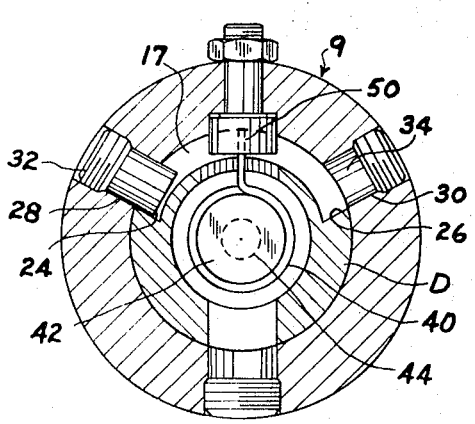
FIG. 2 is a sectional view taken approximately along line 2—2 of FIG. 1.

The toolholder can be readily converted for cutting threads opposite to the set up illustrated in the drawings by reversing the positions of stop screw 32 and plug screw 34 and by rotating rod 44 in the counterclockwise direction as viewed in FIG. 2 until spring 40 imparts the required bias to sleeve 14 to maintain side 26 in engagement with screw 32 secured in hole 30. The toolholder is then moved axially into engagement with the rotating workpiece.

Figure 4:
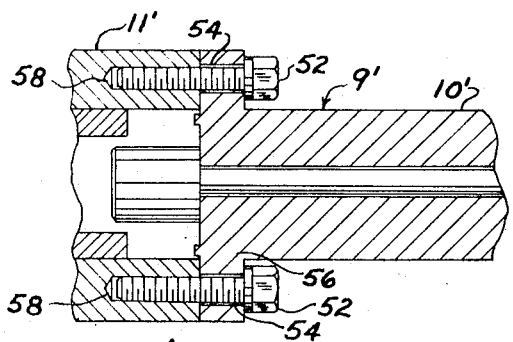
FIG. 4 is a sectional view of a portion of a modified tap holder.

FIG. 4 discloses a modified tap holder sleeve support 9 which includes a shank 10' adjustably connected to a hollow body portion 11' by means of suitable fasteners 52 extending through openings 54 in the shank end flange 56 and engage the threaded openings 58 in body 11'. This support arrangement provides for offsetting the body portion 11' relative to the flange 56 due to the loose fit between openings 54 and the shank part of the fasteners 52. This adjustment is sometimes necessary to accurately align the tap with the workpiece and is particularly useful in automatic machine tools where the tool may be slightly out of alignment with the work holder chuck for various reasons.

From the foregoing, it is apparent that the objects heretofore enumerated and others have been accomplished by the present invention. While the invention has been disclosed in detail hereabove, it is intended to cover all modifications, adaptations and uses which come within the scope of the appended claims.

Having described my invention, I claim:

1. A toolholder for holding a tapping tool adapted to engage a rotating workpiece to thread a portion thereof comprising a tap holder sleeve for receiving and holding a tapping tool therein, a support for the tap holder sleeve having a portion receiving said top holder sleeve for rotation and axial movement relative thereto, spring means for selectively biasing said tap holder sleeve relative to said support in opposite directions of rotation corresponding to the direction of rotation of the workpiece during tapping thereof, means carried by said support and operable to vary the direction of bias of said spring, said support having a portion engageable with a portion of the tap holder sleeve when the tap holder sleeve is biased to a predetermined position by said spring means and effective to move said tap holder sleeve axially toward said workpiece, and means including a lost motion connection between said tap holder sleeve and said portion of said support and providing for axial movement of said tap holder sleeve relative to said support.

2. A toolholder as defined in claim 1 wherein said spring means includes a torsion spring, support means for said spring rotatably carried by said sleeve support and to which one end of said torsion spring is anchored, the other end of said torsion spring being connected to said tap holder sleeve whereby rotation of said spring support means affects the biasing direction of said spring on said sleeve.

3. A toolholder as defined in claim 1 wherein said means providing a lost motion connection comprises a cam on said tap holder sleeve engageable with a cam follower carried by said support whereby rotation of said sleeve relative to said support moves said cam relative to said cam follower permitting axial movement of said sleeve relative to said support.

4. The toolholder as defined in claim 3 wherein said cam includes a cam surface having a protruding central portion and side portions sloping away from the central portion to provide for relative axial movement between said sleeve and said support when said central cam portion moves out of contact with said cam follower.

5. A toolholder as defined in claim 4 wherein said sleeve includes an elongated opening in the periphery thereof defined by a plurality of sides, one of said sides including said cam surface, a pair of opposing sides defining two other sides of said opening and having surfaces adapted to engage an abutment means selectively positionable about the circumference of said support so that said sleeve when biased by said spring disposes one of said two opposing surfaces of said sleeve in engagement with said abutment means carried by said support prohibiting relative rotation between said sleeve and said support in one direction of rotation while permitting rotation thereof in the opposite direction against the bias of said spring.

6. A toolholder as defined in claim 1 further comprising a stop means on said support and positionable in one of two positions and against which said sleeve abuts under the bias of said spring.

7. A toolholder as defined in claim 6 wherein said stop means includes a stop screw selectively positionable in one of a plurality of threaded holes spaced about said support means and when positioned in the selected hole prevents rotation of said sleeve in one direction.

8. A tool holders as defined in claim 1 wherein said support comprises a shank portion and an enlarged hollow body portion connected thereto and adapted to receive said sleeve, spring support means having a portion disposed in said hollow portion of said support body and an elongated portion extending through said shank with the end thereof accessible from the end of said shank whereby adjustment of said elongated portion affects the direction in which said spring biases said sleeve.

9. A toolholder as defined in claim 8 including means mounting said support body portion for radial adjustment relative to said shank portion.

10. A toolholder for holding a tapping tool adapted to engage a rotating workpiece to thread a portion thereof comprising a tap holder sleeve for receiving and holding the tapping tool therein, a support for the tap holder sleeve having a portion receiving the tap holder sleeve for rotation and axial movement relative thereto, torsion spring means for biasing said tap holder sleeve relative to said support in opposite direction of rotation corresponding to the direction of rotation of the workpiece during tapping thereof, means operable to vary the direction of bias of said spring, said support having a portion engageable with a portion of the tap holder sleeve when the tap holder sleeve is biased to a predetermined position by said torsion spring means and effective to move said tap holder axially toward said workpiece.

11. A toolholder as defined in claim 10 wherein said last means includes a rod adjustably secured to and supported by said support and about which said torsion spring is coiled, said spring means having one end anchored to said rod and the other end connected to said sleeve whereby rotation of said rod relative to said support effects the direction of bias of said spring means on said sleeve.

12. A toolholder as defined in claim 10 wherein said support portion and said engageable sleeve portion include a cam and cam follower arranged during tapping to prohibit relative axial movement between said sleeve and said support in the direction opposite the feed direction while permitting relative axial movement in the direction of feed when said sleeve and support are biased in said predetermined position.

13. A toolholder as defined in claim 12 wherein rotation of said sleeve against the bias of said torsion spring means produces relative rotation between said cam and cam follower thereby permitting relative axial movement between said sleeve and support in said opposite direction whereby the tapping tool can move out of engagement with the workpiece without damaging the threads.

14. A toolholder as defined in claim 12 wherein said sleeve has an elongated opening therein defined by a plurality of sides and said cam forms one of said sides and said cam follower is supported by said support to engage with said cam.

15. A toolholder as defined in claim 14 wherein said cam includes a high central portion and two oppositely inclined side portions sloping from said central portion toward said tool and said cam follower is engageable with said central cam portion when said sleeve and support are in said predetermined position and said cam follower is alignable with one of said sloping side cam portions when said sleeve is rotated against the bias of said spring means providing for relative axial movement between said sleeve and support in said opposite direction.

16. A toolholder as defined in claim 14 wherein the distance between the cam and the side opposite thereto is substantially greater than the corresponding dimension of said cam follower whereby a gap exists between said side opposite and said cam follower providing for relative axial movement of said sleeve and support in the feed direction when said sleeve and support are disposed in said predetermined position and said spring is effective to bias said sleeve axially relative to said support to cause said cam follower and said central cam portion to engage when said tool is completely withdrawn from said workpiece.

17. A toolholder as defined in claim 10 wherein said sleeve includes an elongated opening in the periphery thereof defined by a plurality of sides, one of said sides including said cam surface, a pair of opposing sides defining two other sides of said opening and having surfaces adapted to engage an abutment means selectively positionable about the circumference of said support so that said sleeve when biased by said spring disposes one of said two opposing surfaces of said sleeve in engagement with said abutment means carried by said support prohibiting relative rotation between said sleeve and said support in one direction of rotation while permitting rotation thereof in the opposite direction against the bias of said spring.

18. A toolholder as defined in claim 10 wherein said support comprises a shank portion and an enlarged hollow body portion connected thereto and adapted to receive said sleeve, spring support means having a portion disposed in said hollow portion in said body about which said spring is coiled with one end thereof anchored thereto and an elongated portion extending through said shank with the opposite end projecting from the end of said shank whereby adjustment of said elongated portion effects infinite degree of biasing of said spring on said sleeve.

19. A toolholder as defined in claim 18 including means mounting said support body portion for radial adjustment relative to said shank portion.

20. A toolholder for holding a tapping tool adapted to engage a workpiece to thread a portion thereof comprising a tap holder sleeve for receiving and holding a tapping tool therein, a support for the tap holder sleeve having a portion receiving said sleeve for rotation and axial movement relative thereto, and means for providing a lost motion connection between said tap holder sleeve and said portion of said support and providing for relative axial movement between said tap holder sleeve and said support, said lost motion connection comprising an elongated opening in said sleeve defined by a plurality of sides, a cam formed along one of said plurality of sides, a cam follower connected to said support and disposed in said opening in opposed relationship to said cam and arranged to engage a portion of said cam when said sleeve is disposed in a predetermined position to prevent relative axial movement therebetween in a direction opposite the direction of feed of the toolholder toward the workpiece, said cam includes a high central portion and two oppositely inclined side portions sloping from said central portion toward said tool and said cam follower is engageable with said central cam portion when said sleeve and support are in said predetermined position and said cam follower is alignable with one of said sloping sides of said cam portions when said sleeve is in a second predetermined position providing for relative axial movement between said sleeve and said support in said opposite direction.

21. A toolholder for holding a tapping tool adapted to engage a workpiece to thread a portion thereof comprising a tap holder sleeve for receiving and holding a tapping tool therein, a support for the tap holder sleeve having a portion receiving said sleeve for rotation and axial movement relative thereto, and means for providing a lost motion connection between said tap holder sleeve and said portion of said support and providing for relative axial movement between said tap holder sleeve and said support, said lost motion connection comprising an elongated opening in said sleeve defined by a plurality of sides, a cam formed along one of said plurality of sides, a cam follower connected to said support and disposed in said opening in opposed relationship to said cam and arranged to engage a portion of said cam when said sleeve is disposed in a predetermined position to prevent relative axial movement therebetween in a direction opposite the direction of feed of the toolholder toward the workpiece, said support comprises a shank portion and an enlarged hollow body portion connected thereto and adapted to receive said sleeve, means mounting said body portion for radial adjustment relative to said shank portion whereby said body portion can be adjusted relative to the shank portion to effect proper axial alignment between the tool and the workpiece.

22. A toolholder as defined in claim 20 wherein the distance between the cam and the side opposite thereto is substantially greater than the corresponding dimension of said cam follower whereby a gap exists between said side opposite said cam and the facing side of said follower providing for relative axial movement of said sleeve and support in the feed direction when said sleeve and support are disposed in said predetermined position.

References Cited
UNITED STATES PATENTS

| | | | |
|---|---|---|---|
| 711,085 | 10/1902 | Tyler | 10—89 |
| 2,340,477 | 2/1944 | Kruse | 10—141 |

FOREIGN PATENTS 918,980  10/1954  Germany.

FRANCIS S. HUSAR, *Primary Examiner.*